(12) United States Patent
Kahlert et al.

(10) Patent No.: US 7,303,032 B2
(45) Date of Patent: Dec. 4, 2007

(54) TWO-WHEEL BATTERY-POWERED VEHICLE FOR ONE PERSON

(76) Inventors: Ulrich Kahlert, Kohlweg 60, 66123 Saarbrücken (DE); Reinhard Ansorge, Am Bergacker 55, 46487 Wesel (DE)

( * ) Notice: Subject to any disclaimer, the term of this patent is extended or adjusted under 35 U.S.C. 154(b) by 83 days.

(21) Appl. No.: 11/357,935

(22) Filed: Feb. 17, 2006

(65) Prior Publication Data

US 2006/0202439 A1    Sep. 14, 2006

(30) Foreign Application Priority Data

Feb. 25, 2005  (DE) .................. 10 2005 008 749
Sep. 9, 2005   (DE) .................. 10 2005 043 408
Dec. 13, 2005  (DE) .................. 10 2005 059 361

(51) Int. Cl.
    *B60K 1/00* (2006.01)
(52) U.S. Cl. .................. 180/65.1; 180/21; 280/87.041
(58) Field of Classification Search ............... 180/65.1, 180/21, 7.1, 218, 907, 13; 280/208, 78, 209, 280/205, 266, 282, 87.041
    See application file for complete search history.

(56) References Cited

U.S. PATENT DOCUMENTS

| | | | | |
|---|---|---|---|---|
| 1,668,623 A | * | 5/1928 | Avril ..................... | 280/87.021 |
| 4,054,319 A | * | 10/1977 | Fogg et al. .................. | 297/466 |
| 4,254,948 A | * | 3/1981 | Jacobs .......................... | 482/68 |
| 4,456,086 A | * | 6/1984 | Wier et al. ..................... | 180/11 |
| 4,809,804 A | * | 3/1989 | Houston et al. ........... | 180/65.5 |
| 6,125,957 A | * | 10/2000 | Kauffmann ................ | 180/65.1 |
| 6,561,294 B1 | * | 5/2003 | Kamen et al. ................ | 180/21 |
| 6,601,869 B2 | * | 8/2003 | Porcheron ................... | 280/648 |
| 6,676,138 B1 | * | 1/2004 | Rosso .................... | 280/11.221 |
| 6,837,504 B2 | * | 1/2005 | Garner .................. | 280/87.041 |
| 7,004,271 B1 | * | 2/2006 | Kamen et al. ................ | 180/21 |
| 7,219,912 B2 | * | 5/2007 | Meyer ..................... | 280/304.1 |

\* cited by examiner

*Primary Examiner*—J. Allen Shriver
*Assistant Examiner*—Bridget Avery
(74) *Attorney, Agent, or Firm*—Friedrich Kueffner

(57) ABSTRACT

A two-wheel battery-powered vehicle has a platform and two wheels connected to the platform, wherein a battery-powered wheel drive drives the wheels. An attachment is connected to the platform and a sensor device is arranged in the platform. A person standing on the platform and engaging the attachment moves the platform into an angle position corresponding to a body position of the person. Based on the angle position of the platform, the sensor device controls the wheel drive such that, by acceleration or deceleration, the vehicle and the person standing on it are kept in a balanced position. A right/left control controls turning of the vehicle in a traveling direction by driving the wheels at different speed. The attachment has a leg support device for at least one leg of the person standing on the platform for keeping the platform at a desired angle position.

20 Claims, 8 Drawing Sheets

TWO-WHEEL BATTERY-POWERED VEHICLE FOR ONE PERSON

BACKGROUND OF THE INVENTION

1. Field of the Invention

The invention relates to a two-wheel battery-powered vehicle for a person that is standing on a platform of the vehicle and keeps the platform in an angle position corresponding to a body position of the person by means of an attachment arranged on the platform, wherein, based on a sensor device that determines the angle position of the platform relative to a horizontal position, a wheel drive is controlled such that the wheel drive, by acceleration and deceleration, keeps the vehicle with the person balanced, and wherein a separately actuatable right/left control is provided by different driving velocities applied to the two wheels.

2. Description of the Related Art

Such a vehicle is in use and is known under the name "Segway". The platform of this known vehicle has the configuration of a flat box in which the battery, the sensors, and the control are arranged. The standing surface is positioned at the comfortable height of a usual stair step. The person steps from the rear onto the platform and grips two handles that, similar to a bicycle handlebar, are arranged on a column arranged on the platform. One handle is a rotary handle with which the control right/left is achieved. The speed control is achieved by a special type of balance control: The more the person and the column supporting the handles move forwardly, the faster the vehicle moves forwardly. When tilting to the rear, the vehicle moves to the rear. When the vehicle stands still, the balance is maintained by acceleration and counter acceleration instead of by acceleration and deceleration. The vehicle continuously moves back and forth within small fractions of a second.

SUMMARY OF THE INVENTION

It is an object of the present invention to develop further utilizations of the vehicle.

In accordance with the present invention, this is achieved in that the aforementioned attachment is designed for resting against at least one leg of the person in order to keep the platform in the aforementioned angle position.

The control right/left can be foot-actuated. However, it could also be realized in several different ways, for example, by slight tilting of the attachment to the side by means of the legs or by means of tilting sensors arranged on the head and by tilting the head to the appropriate side.

In the embodiment of the vehicle in accordance with the present invention, the person utilizing the vehicle therefore has arms and hands free. The person can point, gesticulate, carry out manipulations, carry objects etc . .

The possible applications are manifold. They include leisure time activities, performance art events, actual transport of persons, for example, on plant premises and in manufacturing halls.

In an advantageous embodiment, the attachment that extends preferably minimally past the knee rests with a curved and/or angled shell, preferably on the inner side, against the first leg. In addition, a more flat rest for the second leg can be provided such that the person with his second leg can press the shell against the first leg. In this way, the slanted positioning of the platform in accordance with the body position, on which principle the vehicle function is based, is ensured under all conditions.

The embodiments can and should be designed such that above the lateral areas of the platform on either side of the attachment there is space for the legs for leaving the platform even toward the front.

In this way, when arriving at a target location, the remaining transport on foot can be shortened. In a possible danger situation, it is also possible to jump from the vehicle in the forward direction (toward the front). The vehicle is mounted from the rear as is conventional.

An expedient embodiment of the invention is characterized by a replacement part that is designed for contacting the leg. The replacement part is connectable to the base column of a commercially available vehicle of the aforementioned kind in place of the usual commercially provided height-adjustable column having handles.

The replacement part enables retrofitting of the vehicle but also an economic variation within the production.

In particular for retrofitting, for the right/left control of the vehicle it is proposed to provide two foot pedals; furthermore, the replacement part is provided with a rocker device that is provided with the foot pedals; by means of at least one arm projecting upwardly from the rocker device, an electric control member mounted on the replacement part is actuated for the control right/left. Preferably, the electric control member is a control member that is removed from the rotary handle of a commercially available attachment of the vehicle.

Moreover, the control member can be provided with a drive means cooperating with the arm, preferably a pin that is mounted on a rotary disk that engages a slotted hole or a bifurcation of the arm.

When the vehicle is produced from the start in accordance with the present invention, the control right/left will be realized preferably in a different way, for example, by pressure switches or by means of sensors in the platform that react to weight shifting from one foot to the other.

Finally, according to a further advantageous embodiment of the invention, a support, preferably a bow-shaped support, is provided for an object to be carried on the vehicle; the support is arranged to be pivotable to the front and to the rear on the vehicle, preferably on or near the wheel axle, and can be connected to the body, preferably by a bracket laterally engaging the body.

The support that extends approximately to the waist of the person is provided in particular as a hard mount of a camera.

A kit for retrofitting a commercially available vehicle comprises preferably the replacement part with the attachment and the extension, the rocker device, the pedals including attachment means, and the strand, optionally also the aforementioned support.

DESCRIPTION OF THE PREFERRED EMBODIMENTS

Figure 1:
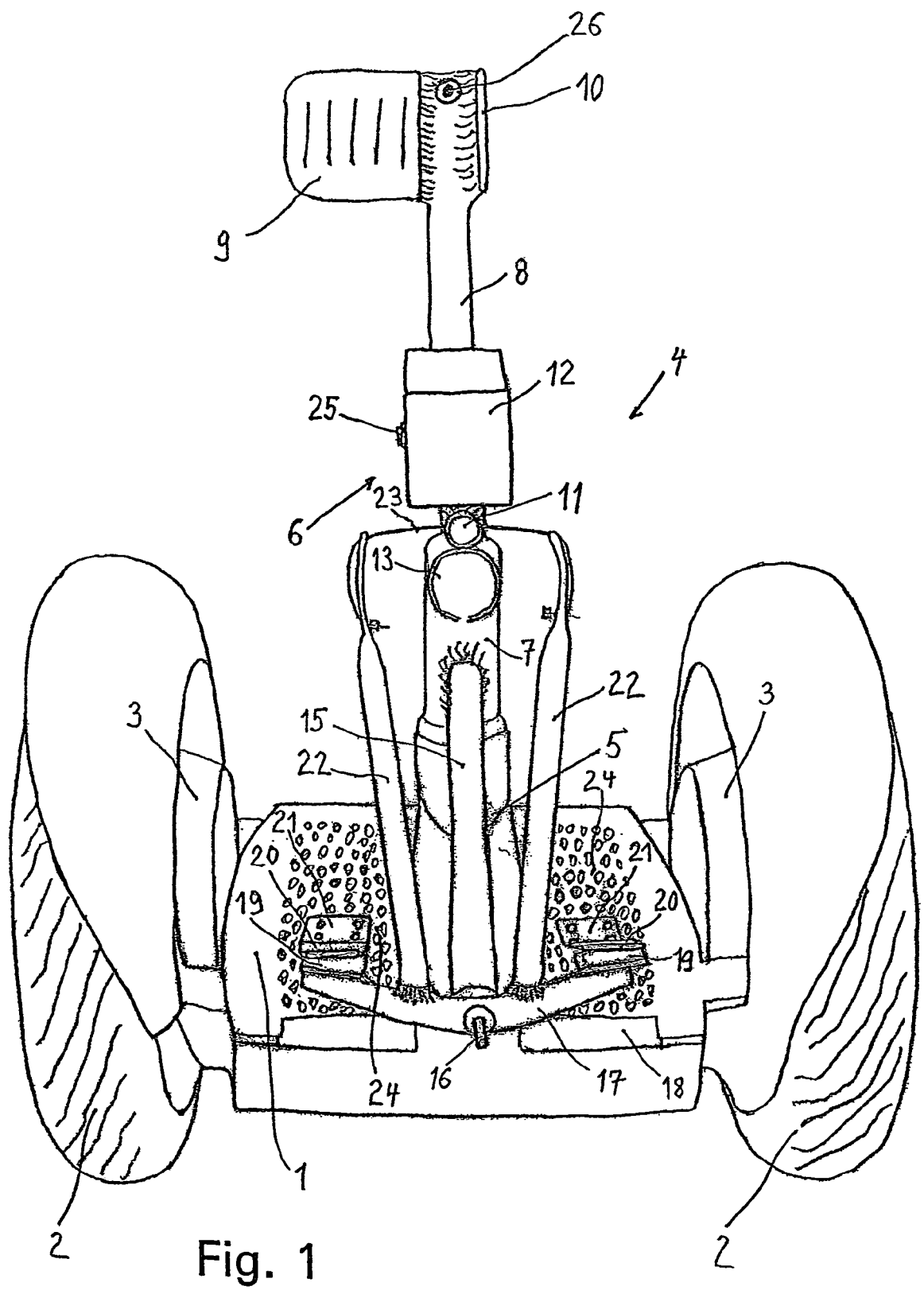
FIG. 1 shows a vehicle in accordance with the invention in a view from the front which vehicle has been created by a simple mechanical retrofitting of a commercially available vehicle.

On the platform 1 configured as a flat box two wheels 2 are arranged. They are driven by wheel motors 3 that are powered by a battery arranged in the platform.

An attachment 4 at the front end of the vehicle extends upwardly from the platform 1. It is comprised of a rigid base column 5 fixedly connected to the platform 1 and an extension part in the form of aluminum welded fabrication 6.

The latter is positioned with a socket 7 on the hollow base column 5. A rod 8 welded to the socket 7 extends at a slant upwardly and supports a leg support device comprising a shell 9 that is approximately semi-circular in cross-section and a flat support plate 10. The shell 9 is provided for contacting a first leg of a person using the vehicle and the flat support plate 10 is provided for contacting the second leg of the person. The shell 9 and the support plate (rest) 10 are understood to be padded.

The two wings of the shell 9 could be provided with hinges about which a wing can fold away when a force, that should not be too small, is surpassed.

The aluminum welded fabrication 6 is designed as an replacement part for retrofitting.

On a projection 11 of the rod 8 a box 12 for receiving control elements is mounted as well as a collar 13 in which a rotary handle 14 is secured that has been taken from a vehicle of the prior art and effects the control right/left.

Moreover, a rod 15 as an extension is connected by welding to the socket 7 and extends downwardly adjacent to the base column 5. A rocker device 17 is pivotably connected to the rod 15 so that it can swivel about a horizontal axis 16. The rocker device 17 has freedom of movement within a cutout 18 of the platform. However, it projects with two plates 19 welded thereto upwardly past the surface of the platform 1.

Two foot pedals 20 connected to the platform 1 project past the plates 19. These foot pedals 20 are comprised of flat tongues, visible in FIG. 1 only from the front, and are connected to be pivotable about a horizontal axis, respectively, on a holding plate 21 screwed onto the platform 1.

Two rods 22 connected to the rocker device 17 by welding project upwardly away from the rocker device. A thin wire cable 23 is attached to the rods 22 and is looped about the rotary handle 14 and fastened thereto with the center of the loop.

Reference numeral 24 indicates textured standing surfaces for both feet. Finally, on the box 12 an on/off switch 25 is provided; at the upper end of the rod 8 an emergency off switch 26 can be seen.

The person utilizing the vehicle steps onto the two standing surfaces 24; a first leg is positioned in the shell 9 and the second leg is placed against the support plate 10. The front part of the feet rests on a foot pedal 20, respectively.

When the person tilts forwardly, the vehicle moves forwardly the faster the greater the forward slant angle. When the person tilts backwardly, the vehicle moves to the rear.

For moving to the right, the right foot presses onto the right pedal 20 and the left foot yields the left pedal 20. The rocker device 17 adjusts accordingly and thereby rotates by means of the cable 23 the rotary handle 14. The left wheel 2 now rotates faster than the right wheel so that the vehicle carries out a right hand turn. The degree of pivoting of the rocker device 17 by means of the feet determines the radius of the curve. Turning to the left is carried out in the same way in reverse.

Figure 4:
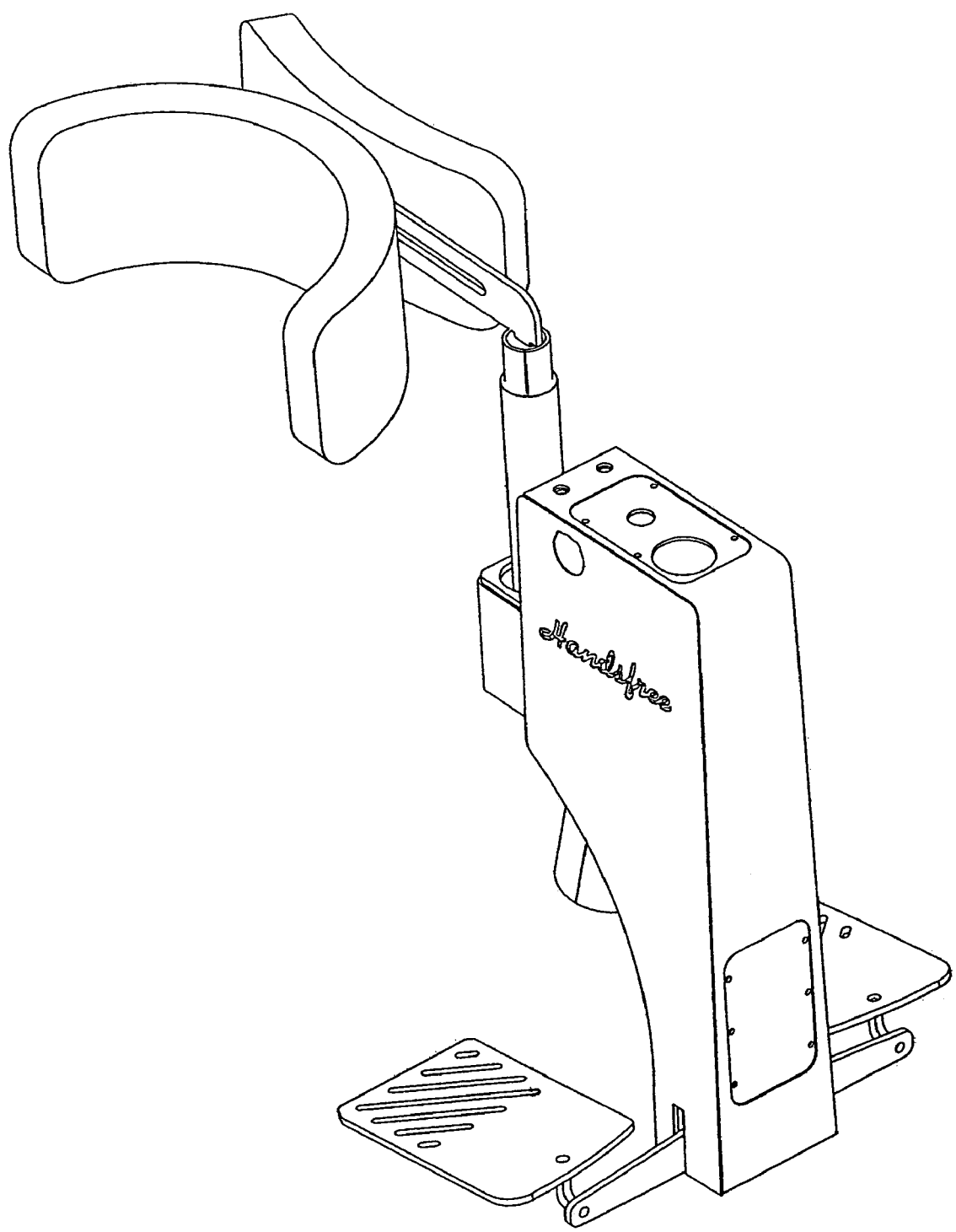
FIG. 4 shows in an isometric illustration a replacement part that is different from that shown in FIGS. 1 and 2 for the vehicle that is the same in other respects.

FIG. 4 shows a replacement part 31 that is modified in comparison to the aluminum welded fabrication 6.

Figure 2:
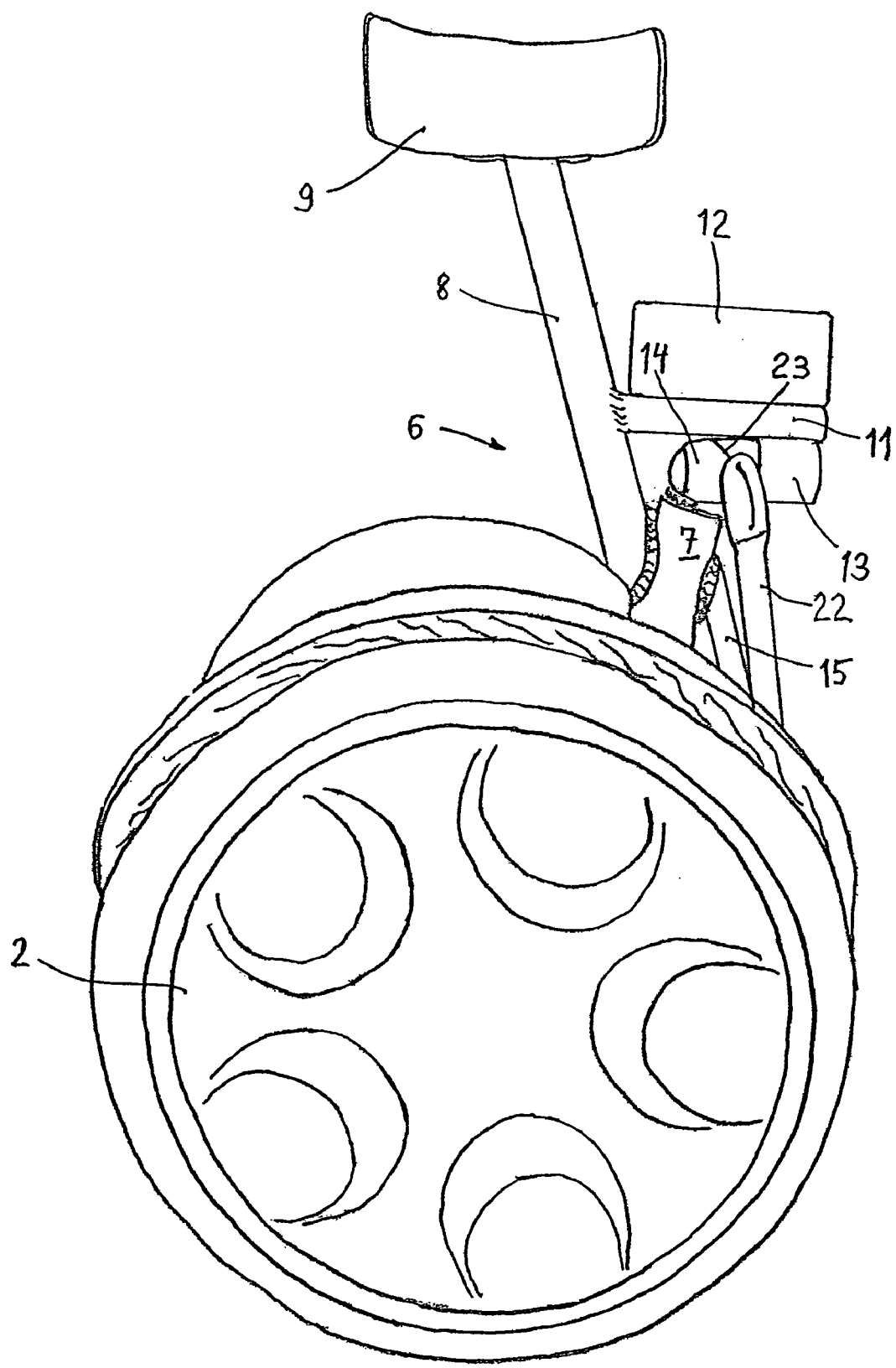
FIG. 2 shows the vehicle of FIG. 1 in a view from the side.
Figure 3:
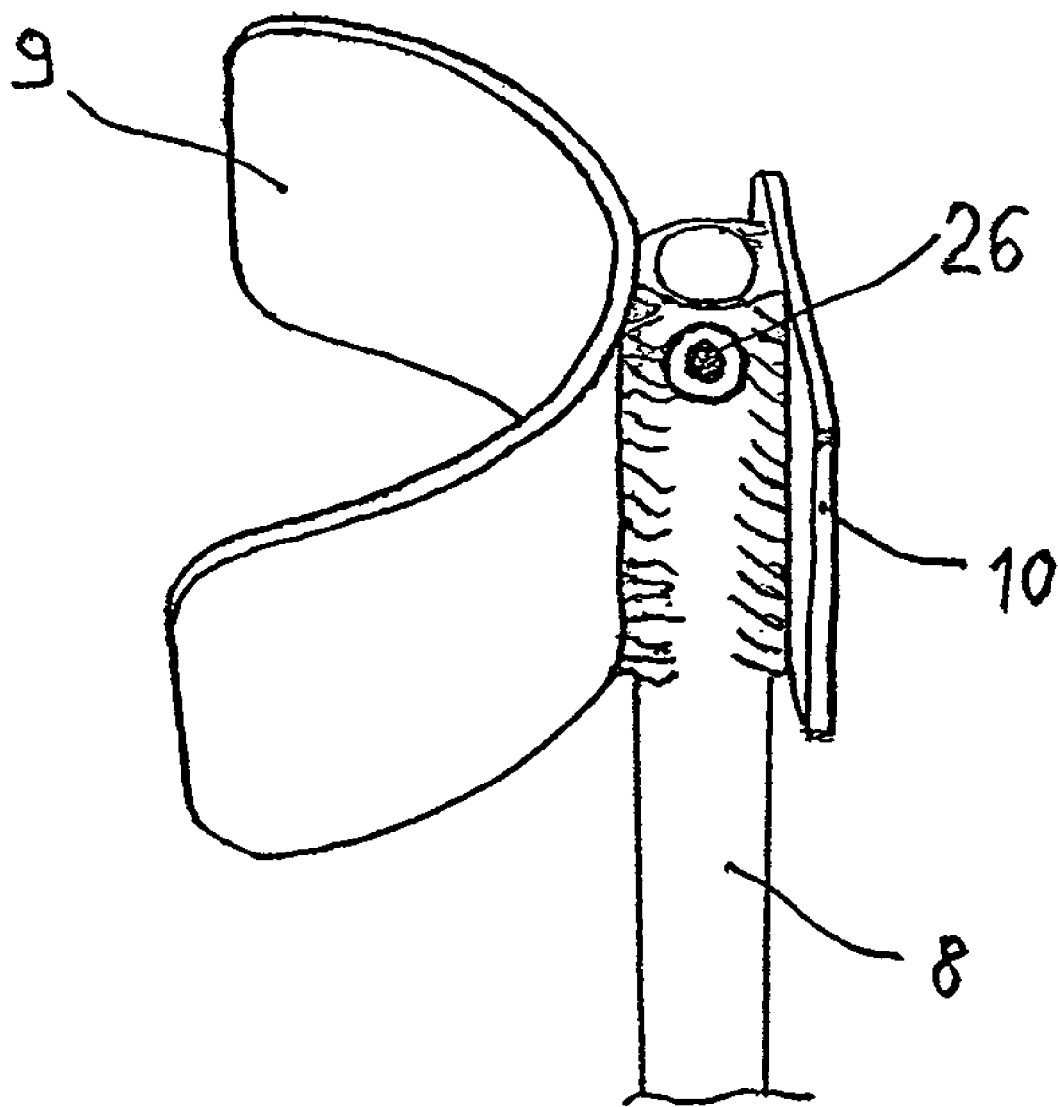
FIG. 3 shows a detail in an isometric illustration from the front in a view from above.

The replacement part 31 is attached by means of a slanted socket 32, corresponding to the socket 7, on the base column 5 of the vehicle. It has the configuration of a box-shaped column 33 that provides a holder 34 for a shell 35 and a support plate 36, comparable to elements 9 and 10 of FIG. 1 and FIG. 2.

The column 33 has a wide section 37 positioned above the base column 5 that passes into a narrow section (extension) 38 positioned in front of the base column 5 and extending downwardly.

The wide section 37 has a bottom 39 and an intermediate bottom 40 arranged above bottom 39; the socket 32 is secured to the bottoms 39, 40.

A rear wall 41 of the wider section 37 adjoins the bottom 39 and extends upwardly; a rear wall 42 of the narrow section 38 adjoin the bottom 39 and extends downwardly. The side walls 43 of the box-shaped column 33 project downwardly and to the rear somewhat past the bottom 39 and the rear wall 42 and form a curved transition between the wide section 37 and the narrow section 38. In the cover part 44 and the front wall 45 of the box-shaped column 33, removable lids 46 and 47 are provided that are screw-connected.

On the rear wall 41 a receptacle 48 in the form of a small upwardly open box for the holder 34 is mounted.

The lower part 49 of a telescoping rod is pivotably connected, not illustrated in detail, with its lower end in the receptacle 48 and is supported laterally by means of two rubber stops arranged in the receptacle on opposed sides. The upper part 50 of the telescoping rod is securable in different positions relative to the lower part 49 and supports an arm 51 on which the shell 35 and the support plate 36 are attached. The position of the shell 35 end of the support plate 36 on the arm 51 can be changed.

On the rear wall 42 a hinge 52 supports a rocker device 53. The rocker device 53 passes through two slots 54 in the sidewalls 43 out of the column 33 and supports at its ends two pedals 55. The pedals 55 have a position at a minimal height above the platform 1 of the vehicle; the rocker device 53 is positioned in front of the platform 1.

A control member 56 of a commercially available vehicle is arranged above the rocker device 53 on the rear wall 42. It has a rotary disk 57 with pin 58 as a driver that engages an arm 59 with bifurcation 60 projecting from the rocker device 53. By actuating the rocker device 53 by means of pedals 55 and transmitting the movement via the arm 59 and the rotary disk 57 onto the control member 56, the vehicle can be controlled and steered. This type of control as well as speed control have been described above.

The lid 47 makes the control member 56 accessible. Underneath the lid 46 the electronics is accessible.

Figure 5:
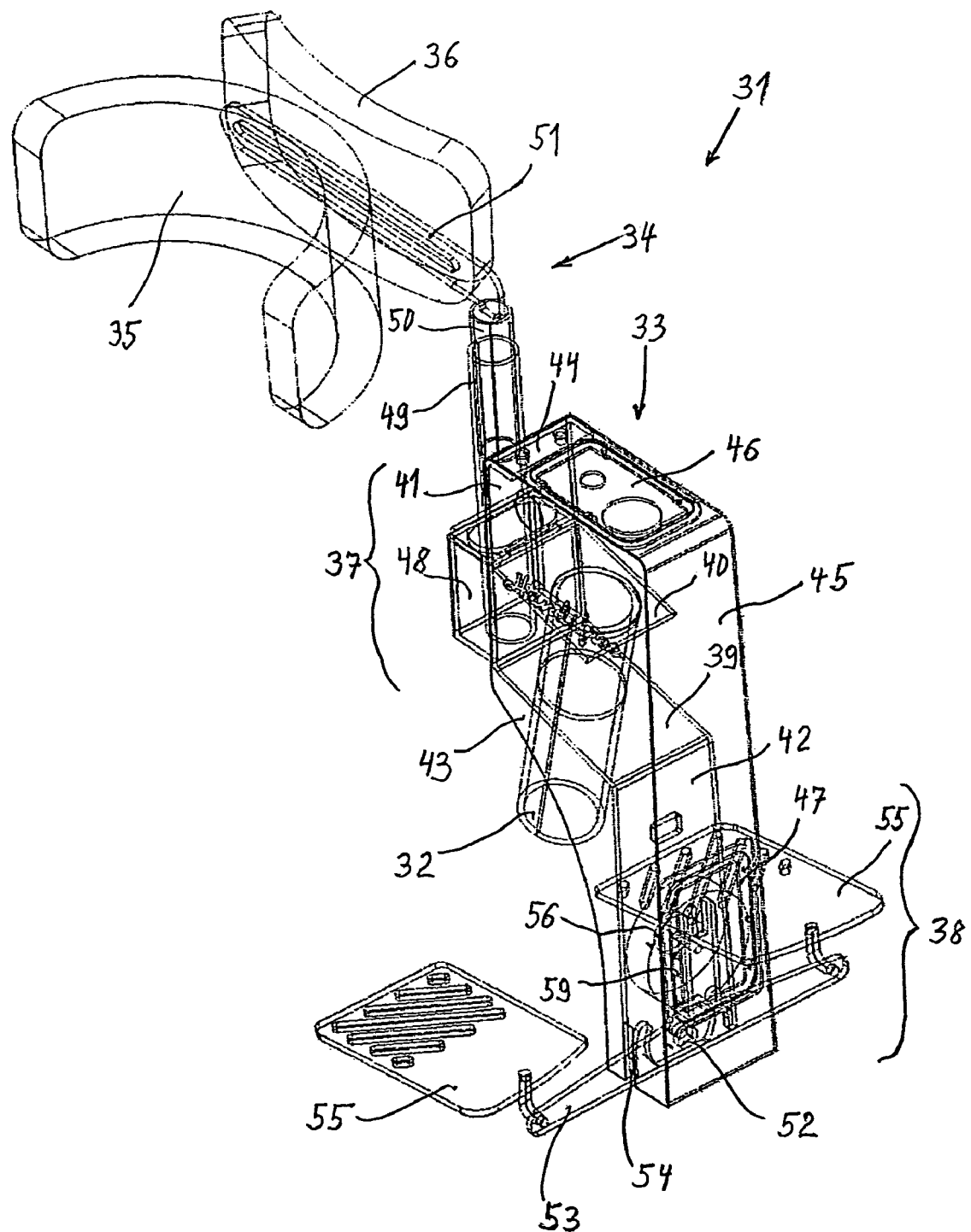
FIG. 5 shows the replacement part according to FIG. 4 in the same isometric illustration but showing also the parts that are actually invisible or hidden.
Figure 6:
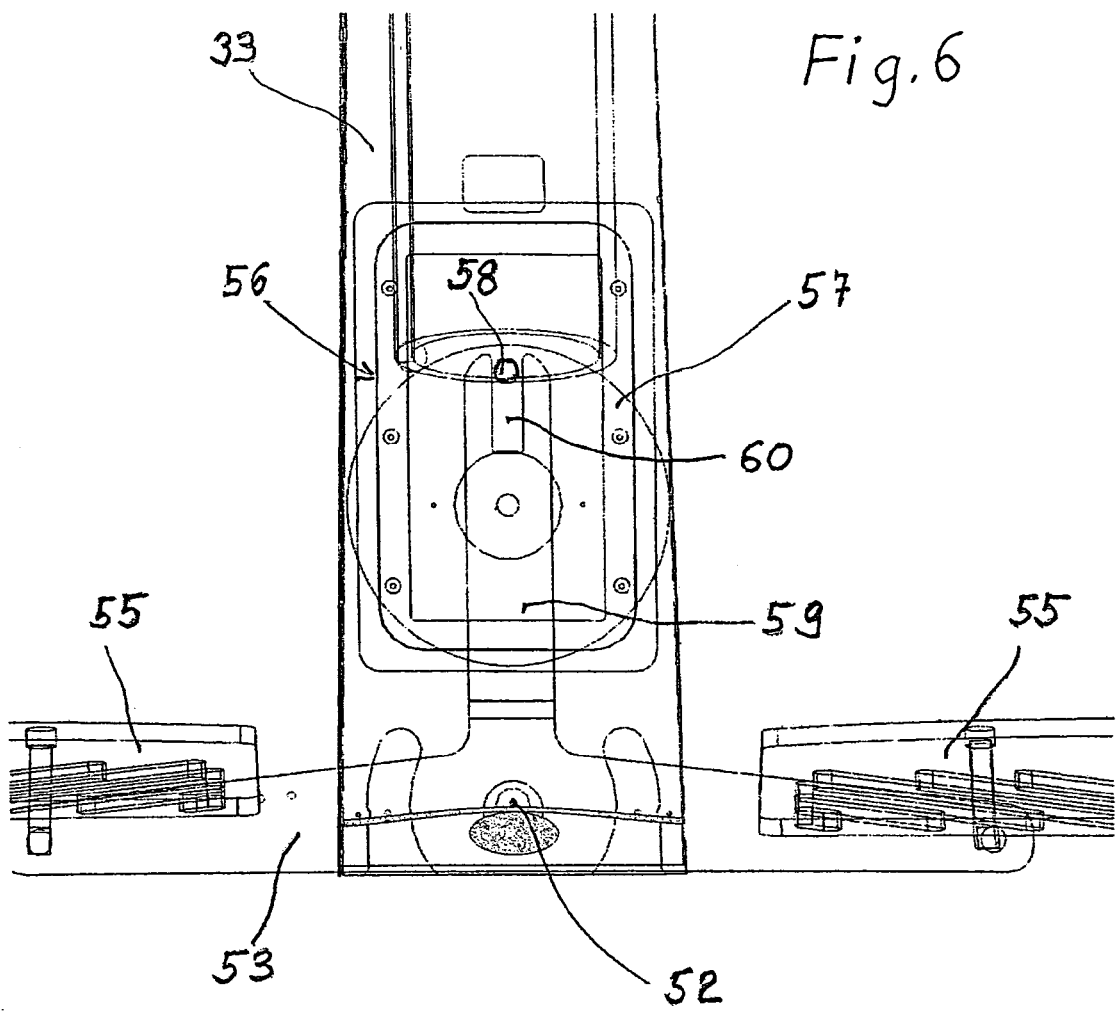
FIG. 6 shows schematically a detail.
Figure 7:
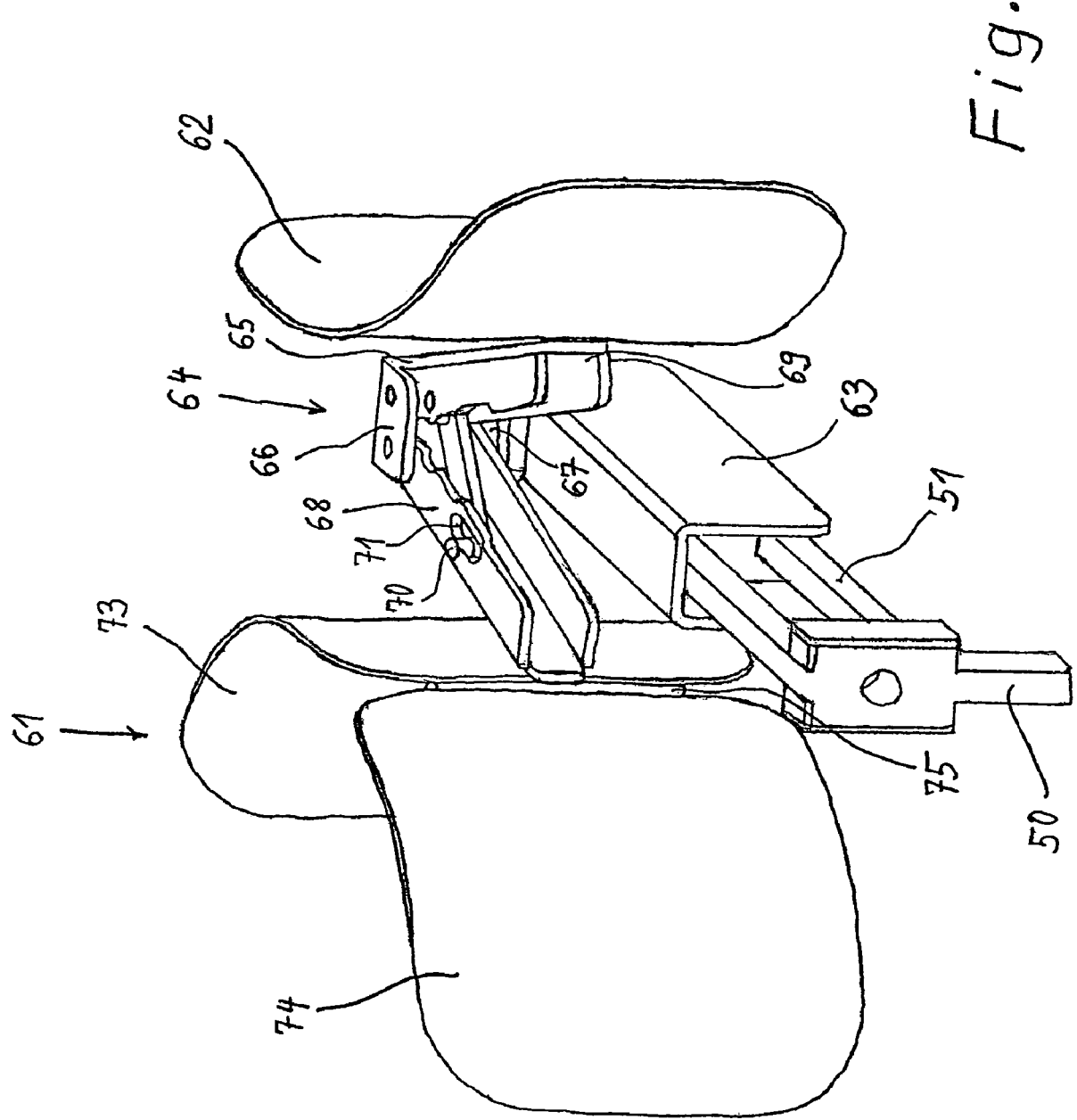
FIG. 7 shows a further modification of a detail in isometric illustration.

FIG. 7 shows the arrangement of the curved shell and the flat support plate (rest), identified at 61 and 62, and modified relative to FIG. 5. On the arm 51 a holder 64 is provided that can be moved by means of base part 63 of U-shaped cross-section and secured in different positions; this arrangement enables the shell 61 and the support plate 62 to be moved into differently spaced relative positions to one another in order to provide adjustment to a body configuration, respectively.

At the end of the base part 63 an upwardly projecting console 65 is arranged on which ends of two holding arms 68 and 69 are mounted pivotably between an upper angle portion 66 and a lower angle portion 67. The other end of the holding arms 68 and 69 support the shell 61 and the plate 62, respectively. The holding arms 68 and 69, again of a U-shaped cross-section, are connected to one another by a slanted stay 72 that is pivotably connected to the holding arm 69 and engages a slotted hole 71 of the holding arm 68 by means of pin 70.

By fixation of the pin 70 at an appropriate location within the slotted hole 71, an appropriate spread-apart position of the holding arms 68, 69 relative to one another can be secured and the desired spacing between the shell 61 and the support plate 62 can be adjusted. For this purpose, the pin 70 can be provided with a thread and a clamping nut.

The shell 61 is of a two-part configuration. One half 73 is fixedly mounted on the holding arm 68. The other half 74 is connected to the first half 73 by means of a hinge 75, for example, a tension hinge. When surpassing the tension force, the half 74 can thus fold away, if needed.

The shell 61 and the support plate 62 are illustrated without their padding.

Figure 8:
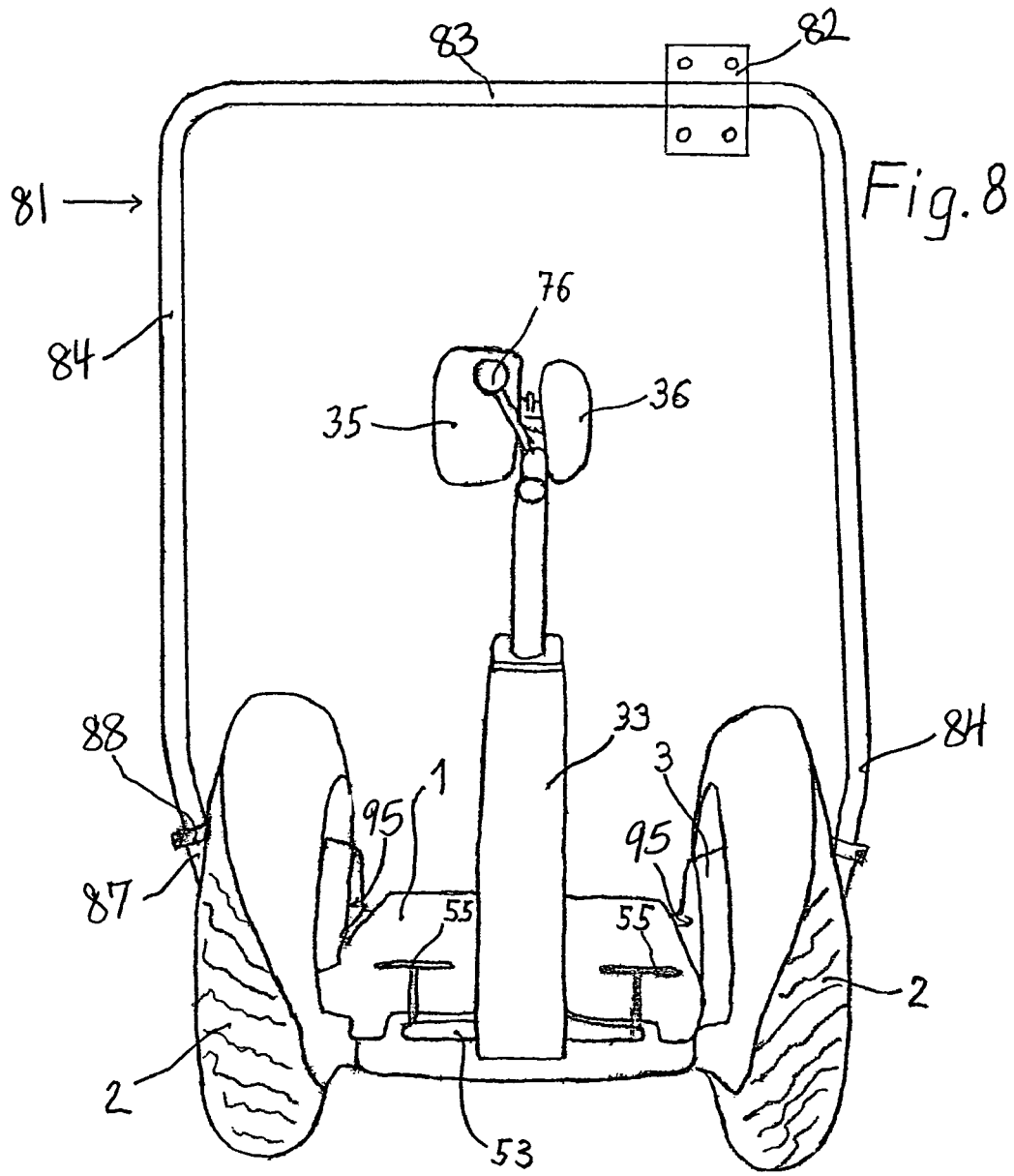
FIG. 8 shows a vehicle with accessory in a front view.

FIG. 8 shows an accessory in the form of a bow-shaped support 81 for an object to be carried. In particular, this concerns a heavy camera that is carried on the body.

In addition to the above mentioned applications, the vehicle according to the invention is suitable in particular for camera operators that want to move parallel to a moving object. For this purpose, there are currently body supports available and devices for compensating the irregularities that are caused by each step when running. The vehicle according to the invention enables a camera operator to carry out a uniform movement by having available full freedom of movement of arms and hands.

With the support 81 this advantage is improved even more. The camera is provided with a "hard mount", which is usually possible only for standing operation of the camera.

The camera or a holder for the camera is attached to the mounting plate 82 that can be moved into position and fastened on a horizontal bow section 83.

Figure 9:
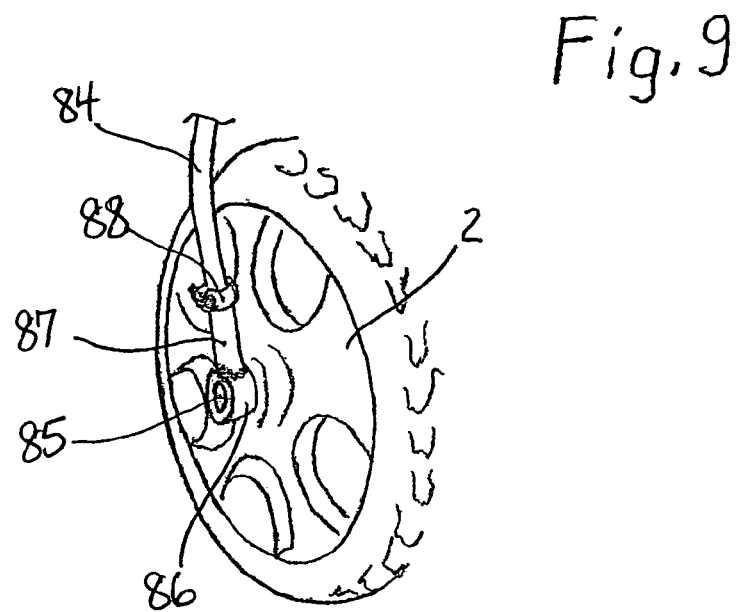
FIG. 9 shows a detail of the vehicle according to FIG. 8 in a view at an angle.

The support 81 is provided with two lateral bow sections 84 pivotably on the geometric wheel axis. For this purpose, a central fastening nut has been removed and replaced with an axle bolt 85 that is provided with an inner thread and serves at the same time as a nut (FIG. 9). On the axle bolt 85 a hub 86 is mounted, either directly or by means of a ball bearing; the hub 86 serves by means of a radially attached socket 87 as a holder for the support 81. The ends of the bow-shaped support 81 are inserted into the socket 87 and fastened thereto by means of the clamp 88. In particular for a somewhat greater length of the socket 87 than the illustrated length, the height of the support 81 can be changed and adjusted telescopingly.

Figure 10:
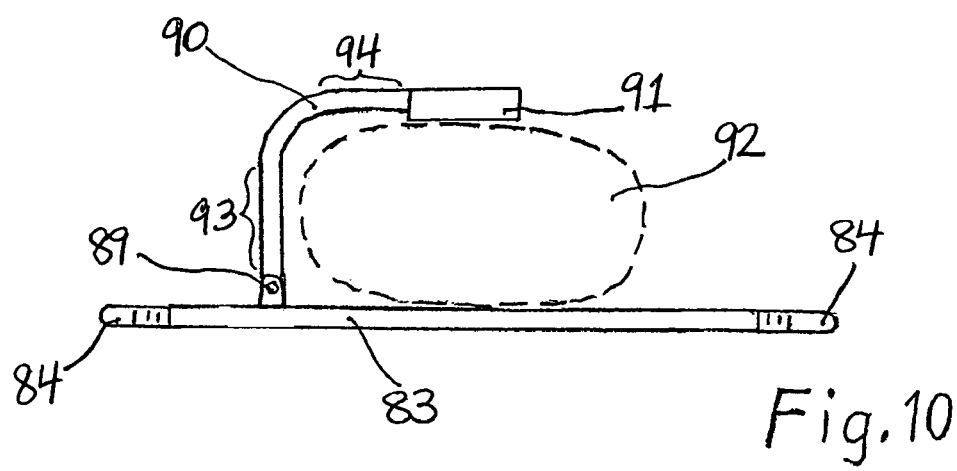
FIG. 10 shows a plan view onto the accessory.

As can be seen in FIG. 10, an angle member 90 with padding 91 at one end can be attached to the horizontal bow section 83 of the support 81 by means of a tension hinge 89. The user of the vehicle stands upright, as illustrated at 92 in dashed lines, in the intermediate space between the horizontal bow section 83 and the padding 91. The person moves laterally into this intermediate space and/or pivots the angle member 90 by using the tension hinge 89 back and forth.

For adjusting the angle member to body dimensions, the angle member 90 can be configured to be adjustable lengthwise in a telescoping fashion within areas indicated by the brackets 93 and 94.

The horizontal bow section 83 is positioned for example at a level slightly below the waist.

In order to reduce the width of the bow-shaped support 81, it could also be pivotably attached for example at the locations of the wheel motors 3 indicated by arrows 95 or on the platform 1. The attachment on the wheel axles is however preferred because the mass of the camera or of other objects has no disturbing effect on the position of the platform 1.

As mentioned above, the operator controls the vehicle speed by means of the shell 35, the column 33 and the position of the platform 1 rigidly connected thereto. When the person tilts the pelvis past the position of his legs forwardly or to the rear, the person entrains the support 81. The acceleration or deceleration effects balancing of the mass or weight of the camera or of the other object in the same way as for the body weight.

When the user wants to or must step down from the platform 1 toward the front, this is still possible by entraining the support 81.

Finally, a handle 76 that is rigidly connected to the column 33 as well as the possibility of connecting a saddle or the like for the user to the support 81 that would then have a reduced height should also be mentioned.

While specific embodiments of the invention have been shown and described in detail to illustrate the inventive principles, it will be understood that the invention may be embodied otherwise without departing from such principles.

What is claimed is:

1. A two-wheel battery-powered vehicle comprising:
   a platform;
   two wheels connected to the platform;
   a battery-powered wheel drive driving the two wheels;
   an attachment connected to the platform;
   a sensor device arranged in the platform;
   a right/left control;
   wherein a person standing on the platform and engaging the attachment moves the platform into an angle position corresponding to a body position of the person, wherein, based on the angle position of the platform relative to a horizontal position, the sensor device controls the wheel drive such that the wheel drive, by acceleration or deceleration, keeps the vehicle and the person standing on the platform in a balanced position;
   wherein the right/left control controls turning of the vehicle to the left or to the right in a traveling direction by driving the wheels at different speed;
   wherein the attachment has a leg support device for at least one leg of the person standing on the platform in order to keep the platform at a desired angle position.

2. The vehicle according to claim 1, wherein the attachment ends above the knee of the person.

3. The vehicle according to claim 1, wherein the leg support device of the attachment comprises a shell that is curved or angled, wherein the shell contacts a first leg of the person.

4. The vehicle according to claim 1, wherein above lateral areas of the platform on opposed sides of the attachment space for the legs of the person is provided for leaving the platform to the sides and toward the front.

5. The vehicle according to claim 1, comprising a replacement part comprising the leg support device for the at least one leg, wherein the replacement part is adapted to connect to a base column of a commercially available vehicle and to replace a height-adjustable column provided with handles of the commercially available vehicle.

6. The vehicle according to claim 1, wherein the right/left control is foot-operated.

7. The vehicle according to claim 1, further comprising a support for an object to be transported, wherein the support is mounted to be pivotable to the front and the rear of the vehicle, wherein the support is connectable to the body of the person.

8. The vehicle according to claim 3, wherein the shell contacts the first leg laterally.

9. The vehicle according to claim 3, wherein the shell contacts an inner side of the first leg.

10. The vehicle according to claim 3, wherein the leg support device comprises a flat support plate for the second leg, wherein the flat support plate is arranged such that the person presses with the second leg the shell against the first leg.

11. The vehicle according to claim 5, wherein the replacement part comprises a box-shaped column and a height-adjustable holder connected to the column, wherein the leg support device is connected to the holder, wherein the replacement part further comprises a slantedly positioned socket connected to the column and connected to the base column.

12. The vehicle according to claim 11, wherein the leg support device comprises a shell contacted by a first leg of the person and a flat support plate contacted by a second leg of the person.

13. The vehicle according to claim 12, wherein the shell and the flat support part have an adjustable spacing relative to one another.

14. The vehicle according to claim 13, wherein the leg support device comprises two pivotable holding arms connected to the shell and the flat support plate, respectively, wherein the two holding arms are adapted to be secured in different spread-apart positions.

15. The vehicle according to claim 6, wherein the right/left control comprises two pedals.

16. The vehicle according to claim 6, comprising a replacement part comprising the leg support device for the at least one leg, wherein the replacement part is adapted to connect to a base column of a commercially available vehicle and to replace a height-adjustable column provided with handles of the commercially available vehicle, wherein on the replacement part a rocker device with pedals is mounted, wherein the rocker device has an arm that projects upwardly and operates an electric control member of the right/left control, which control member is mounted on the replacement part.

17. The vehicle according to claim 16, wherein the control member is taken from a rotary handle of the attachment of a commercially available vehicle.

18. The vehicle according to claim 16, wherein the replacement part has an downward extension positioned adjacent to the base column on which extension the rocker device is arranged.

19. The vehicle according to claim 7, wherein the support is mounted on or near a wheel axle of the wheels.

20. The vehicle according to claim 7, wherein the support is bow-shaped and comprises an angle member engaging the body of the person on one side.

* * * * *